Patented Sept. 9, 1952

2,610,165

UNITED STATES PATENT OFFICE 2,610,165

COMPOSITIONS OF VINYL CHLORIDE RESINS AND AROMATIC ESTERS OF SULFONATED ALKANES

Earl W. Gluesenkamp, Centerville, and Joachim Dazzi, Dayton, Ohio, assignors to Monsanto Chemical Company, St. Louis, Mo., a corporation of Delaware No Drawing. Application August 20, 1949, Serial No. 111,563

12 Claims. (Cl. 260—30.8)

This invention relates to vinyl chloride compositions having unusual flexibility and high stability at elevated temperatures. More specifically the invention relates to a novel group of plasticizers for vinyl chloride polymers which have unusual efficacy in developing desirable physical properties.

Esters of sulfonated aliphatic hydrocarbons are well known and some have been used as plasticizers. The esters, which are prepared from petroleum products, are mixtures of very many different compounds, having wide variations in the length and configuration of the aliphatic chain and in the position on the chain where the sulfonic acid group is substituted. The physical characteristics and the utility of the ester mixtures will depend upon the petroleum stock from which the alkane is separated and by the manner in which it is separated. Many ester mixtures are too volatile for use, others may be incompatible, and others may fail to impart flexibility over wide temperature ranges.

The primary purpose of this invention is to provide new effective compositions for plasticizing vinyl chloride polymers. A further purpose of this invention is to provide vinyl chloride resins which are useful over wide variations in temperature. A still further purpose of this invention is to utilize abundantly available raw materials of low cost, and to prepare useful and inexpensive agents for modifying vinyl chloride resins.

In copending application Serial No. 111,562, filed August 20, 1949, by Earl W. Gluesenkamp and Joachim Dazzi, there are described and claimed esters prepared from sulfonic acids derived from the reaction product of 1-olefins with mercaptoethanol and the subsequent oxidation of the sulfur atom to the sulfonate radical. The sulfonic acids thereby produced are converted to sulfonyl halides and then reacted with phenol or a substituted phenol. This class of compounds requires from ten to fourteen carbon atoms in the hydrocarbon chain to be effective plasticizers.

It has now been found that the aromatic esters derived from the alkane sulfonic acids which are prepared from normal alkanes by the simultaneous reaction of sulfur dioxide and chlorine, require more carbon atoms in the chain for effective plasticizing properties. The esters prepared from normal alkanes of ten to fourteen carbon atoms are in many respects not effective plasticizers for vinyl chloride resins.

It has now been found that very desirable plasticizers can be obtained by the sulfochlorination of alkanes and the subsequent reaction with phenols, if an alkane having from 19 to 21 carbon atoms is used. Desirable plasticizers may also be obtained from paraffin hydrocarbon mixtures or petroleum mixtures, which have in excess of 80 percent by weight of normal alkanes having 19 to 21 carbon atoms. Such hydrocarbon mixtures are solids at normal room temperature, and melt at temperatures slightly in excess of normal room temperatures.

The new plasticizers will have at least 80 percent by weight of a compound having the structural formula:

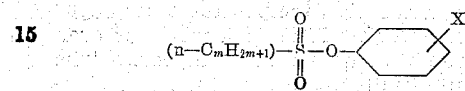

wherein X is a radical of the group consisting of hydrogen, chlorine and methyl, and wherein $m$ is a whole number from 19 to 21, inclusive.

The plasticizers are prepared by the sulfochlorination of a straight chain paraffin fraction having at least 80 percent by weight of molecules having 19 to 21 carbon atoms, and subsequently reacting the sulfonyl chloride thereby produced with phenol or a substituted phenol. The sulfochlorination reaction is conducted in a closed retort provided with a stirrer or other agitation means, and with conduits for the introduction of chlorine and sulfur dioxide. It is beneficial to conduct the reaction in a source of ultraviolet light and to maintain the reaction temperature under control by means of a water bath or other cooling device, temperatures below 50° C. being desirable.

The alkanesulfonyl chlorides are converted to the aromatic esters by charging them gradually to an aqueous alkaline solution of the desired phenol. The aromatic esters of the alkanesulfonic acids separate from the aqueous medium during the reaction.

The new esters are valuable plasticizers for polyvinyl chloride and copolymers of more than 70 percent of vinyl chloride and up to 30 percent of other polymerizable monomers copolymerized therewith, for example vinyl acetate and other vinyl esters of monocarboxylic acids, ethyl maleate, ethyl fumarate and other alkyl esters of maleic and fumaric acids.

The plasticizers are blended with the vinyl resins in the conventional manner, for example by mixing on a roll mill, a Banbury type mixer or any other suitable mixing device. The plasticizers are used in proportions necessary to achieve the desired plasticity. Although the quantity of plasticizer will depend upon the particular polymer to be plasticized and upon its molecular weight it is generally found that compositions containing from five to 50 percent of plasticizer will in most cases produce satisfactory results in a broad field of uses. Such quantities of plasticizer will generally remain as a permanent part of the vinyl resin and the modified vinyl resin so prepared will not deteriorate or become embrittled by reason of the loss of the plasticizer during use.

The value of the plasticizers are estimated by three tests (1) compatibility (2) volatility and (3) Clash-Berg flex temperature. The compatibility is determined by visual inspection, clarity being a requisite in most applications for vinyl chloride polymers. The volatility is estimated by the test of heating at 105° C. for 24 hours and measuring the percentage of the plasticizers evaporated by loss of weight. The Clash-Berg flex temperature is determined by cooling the polymer sample to about −50° C. and observing the change in the modulus of rigidity as the sample warms up to room temperature, the flex temperature being that at which the modulus of rigidity is 135,000 pounds per square inch. Of these tests the compatibility is of primary importance while the others are only critical for certain applications. If the polymers is to be subjected to outside weather conditions flex temperatures of −20 to −30° C. are desirable. If the polymer is to be subjected to elevated temperatures a volatility of five to ten percent is required. In applications where high temperatures are regularly encountered volatilities below five or even as low as one percent are advantageous. The volatilities and flex temperature of polymer plasticizer blends are difficult to predict and often have no apparent relationship to the physical constants of the plasticizer.

The new plasticizers are of general utility in softening vinyl chloride polymers. They may be used as the only plasticizing component in a compounded vinyl chloride polymer or they may be used in conjunction with other plasticizers.

Further details of the practice of this invention are set forth with respect to the following specific examples.

*Example 1*

A paraffin hydrocarbon mixture containing essentially the saturated straight chain hydrocarbons having 19 to 21 carbon atoms, was sulfochlorinated and thereafter reacted with phenol. The esters so prepared were then milled with polyvinyl chloride and the plastic compositions so prepared, containing 40 percent plasticizer, were examined to determine the flex temperature and volatility. It was found that the volatility was 0.47 percent and the flex temperature −34° C.

*Example 2*

The procedure of the preceding experiment was duplicated, except that cresol was used in place of phenol. When incorporated in polyvinyl chloride the compositions containing 40 percent of the esters, were found to have a flex temperature of −33° C. and a volatility of 2.47 percent. Chemical analysis of this plasticizer indicated the presence of unreacted alkane indicating that the volatility is substantially higher than it would be if a more thorough purification procedure had been used.

*Example 3*

Using the procedure described in Example 1, except that a paraffin (87–90%) having a boiling point of 476° F. to 568° F. was used. This fraction represents an average of 16 carbon atoms to the molecule. The phenol esters derived from the sulfochlorinated alkanes were found to have a volatility of 8.6 percent and a flex temperature of −22° C.

The invention is defined by the following claims:

1. A plasticized vinyl chloride resin, which comprises a vinyl chloride polymer which contains intimately dispersed therein a compound having the structural formula:

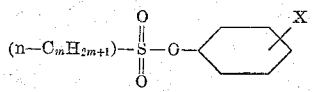

wherein X is a radical of the group consisting of hydrogen, chlorine and methyl, and wherein $m$ is a whole number from 19 to 21, inclusive.

2. A vinyl chloride resin, which comprises polyvinyl chloride which contains intimately dispersed therein a compound having the structural formula:

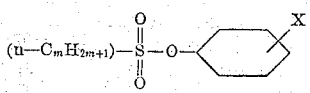

wherein X is a radical of the group consisting of hydrogen, chlorine and methyl, and wherein $m$ is a whole number from 19 to 21, inclusive.

3. A vinyl chloride resin, which comprises a copolymer of at least 70 percent vinyl chloride and up to 30 percent of an olefinic monomer copolymerizable therewith, said copolymer having intimately dispersed therein a compound of the structural formula:

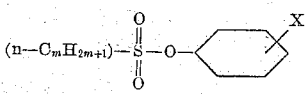

wherein X is a radical of the group consisting of hydrogen, chlorine and methyl, and wherein $m$ is a whole number from 19 to 21, inclusive.

4. A vinyl chloride resin, which comprises a copolymer of at least 70 percent vinyl chloride and up to 30 percent of a monomer of the group consisting of the vinyl esters of carboxylic acid, the alkyl maleates and the alkyl fumarates, having intimately dispersed therein a compound having the structural formula:

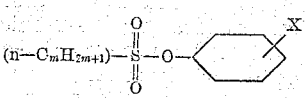

wherein X is a radical of the group consisting of hydrogen, chlorine and methyl, and wherein $m$ is a whole number from 19 to 21, inclusive.

5. A vinyl resin which comprises polyvinyl chloride containing intimately dispersed therein from five to 50 percent of the phenyl ester of the alkane sulfonic acids wherein the alkane radical is a straight chain hydrocarbon having from 19 to 21 carbon atoms.

6. A vinyl resin which comprises polyvinyl chloride containing intimately dispersed therein from five to 50 percent of the cresyl ester of the alkane sulfonic acids wherein the alkane radical is a straight chain hydrocarbon having from 19 to 21 carbon atoms.

7. A vinyl chloride resin which comprises a vinyl chloride polymer having intimately dispersed therein from five to 50 per cent by weight of the polymer of a compound with the following structure:

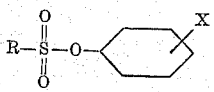

wherein R is an aliphatic hydrocarbon radical and X is a radical of the group consisting of hydrogen, methyl, and chlorine, at least 80 per cent of the said aliphatic hydrocarbon radicals having from 19 to 21 carbon atoms.

8. The composition defined by claim 7 wherein the vinyl chloride polymer is polyvinyl chloride.

9. The composition defined by claim 7 wherein the vinyl chloride polymer is a copolymer of at least 70 per cent vinyl chloride and up to 30 per cent of another mono-olefinic monomer copolymerizable therewith.

10. The composition defined by claim 7 wherein the X substituent is hydrogen.

11. The composition defined by claim 7 wherein the X substituent is methyl.

12. The composition defined by claim 7 wherein the X substituent is chlorine.

EARL W. GLUESENKAMP.
JOACHIM DAZZI.

REFERENCES CITED

The following references are of record in the file of this patent:

UNITED STATES PATENTS

| Number | Name | Date |
|---|---|---|
| 2,486,417 | Jackson et al. | Nov. 1, 1949 |

OTHER REFERENCES

Modern Plastics, vol. 24, No. 7, March 1947, pp. 154–156, 192 and 194.